United States Patent

Deboeur et al.

[15] 3,703,346
[45] Nov. 21, 1972

[54] MOLD FOR VULCANIZING PRE-SHAPED PNEUMATIC TIRES

[72] Inventors: Francois Fernand Deboeur, Liege; Leon Paul Jean Plumhans, Grivegnee-Liege, both of Belgium

[73] Assignee: Uniroyal Aktiengesellschaft, Aache-Rothe-Erde, Germany

[22] Filed: Jan. 13, 1972

[21] Appl. No.: 217,489

Related U.S. Application Data

[63] Continuation-in-part of Ser. No. 92,699, Nov. 25, 1970, abandoned.

[30] Foreign Application Priority Data

April 17, 1971 Germany.........P 21 18 647.0
Nov. 29, 1969 Germany.........P 19 59 982.7

[52] U.S. Cl........................................425/46, 425/39
[51] Int. Cl. ...............................................B29h 5/02
[58] Field of Search.........425/29, 39, 43, 46, 47, 195

[56] References Cited

UNITED STATES PATENTS

| | | |
|---|---|---|
| 3,276,930 | 10/1966 | Keefe......................425/43 X |
| 3,337,918 | 8/1967 | Pacciarini et al............425/39 |
| 3,396,221 | 8/1968 | Balle et al................425/43 X |
| 3,461,502 | 8/1969 | Turk et al....................425/29 |
| 3,460,197 | 8/1969 | Cantarutti et al............425/46 |
| 3,464,090 | 9/1969 | Cantarutti et al........425/46 X |
| 3,447,205 | 6/1969 | Dorsey......................425/195 |

FOREIGN PATENTS OR APPLICATIONS

| | | |
|---|---|---|
| 1,039,049 | 8/1966 | Great Britain...............425/37 |
| 1,096,189 | 12/1967 | Great Britain...............425/36 |

*Primary Examiner*—J. Howard Flint, Jr.
*Attorney*—Jay L. Chaskin

[57] ABSTRACT

This is a mold for vulcanizing pre-shaped tires, in which a plurality of tread-forming mold segments are axially and radially guided into "mold open" and "mold closed" positions, while achieving continuous extended guide surface engagement. A circular actuator slidingly supports the tread-forming mold segments in a circular distribution about the mold axis. Cooperating curved guide surfaces are formed on the actuator and on the segments, and are oriented parallel with the sliding direction of the segments. The curved guide surfaces are selectively inclined relative to the mold axis to obtain a radial component of mold segment motion with axial movement of the actuator. Extended curved surface contact between guide surfaces is maintained throughout mold opening and closing motion, to achieve enhanced structural support and restrict the entry of dirt between the guide surfaces.

21 Claims, 13 Drawing Figures

MOLD FOR VULCANIZING PRE-SHAPED PNEUMATIC TIRES

FIELD OF THE INVENTION

This application is a continuation-in-part of our copending application, Ser. No. 92,699, filed Nov. 25, 1970, now abandoned.

This invention relates generally to molds for vulcanizing pre-shaped tires. More specifically, it concerns an improved tire vulcanizing mold with radially movable tread-forming mold segments.

BACKGROUND OF THE INVENTION

Conventional pneumatic tires have two or more plies of cord fabric, the cords of which are at opposing angles to one another and at about 40° to the mid-circumferential plane of the tire. A radial-cord tire, on the other hand, is usually composed of several plies of fabric the cords of which are at an angle of 90° to the tread circumference. In addition, a belt of several plies is placed circumferentially beneath the tread. This belt, being inexpansible, inhibits radial expansion of the tread section of the tire.

Conventional tire molds usually have top and bottom mold halves, which are separated along a median plane so that each mold half covers one half of the tire. Pre-shaped tires, and particularly radial tires, exhibit greater circumferential inextensibility and much greater sensitivity to distortion before curing, resulting from axial mold motion relative to the tire.

Various tire mold designs have been proposed to vulcanize pre-shaped tires, of which radial ply tires are an example. See, for instance, the molds described in U.S. Pat. Nos. 865,458 of Veith, 1,132,250 of Finlayson, 3,082,480 of Ballé, 3,464,090 of Cantarutti, and 3,358,330 of Picciarini et al. As described in these patents, a plurality of tread-forming mold segments are placed between separable side-wall-forming molds to define a complete mold cavity after the sidewall portions are in their final tire molding positions. The tread-forming mold segments are each mounted for radial movement by means of an actuator operative at the radially outward sides of the segments. Cantarutti discloses a complicated lever mechanism to impart radial movement, while Balle discloses the use of inclined conical surfaces to guide each of the tread-forming mold segments in radial directions, and Pacciarini et al. disclose inclined flat surfaces to guide the tread-forming mold segments. Since the guide surfaces disclosed by Ballé are conical, when they slide relative to one another during opening and closing of the mold, surface contact between them is not maintained. Instead, a line contact is established as soon as the guide surfaces are slightly moved relative to each other. In effect, clearance spaces are then opened between the conical guide surfaces, allowing dirt to accumulate between them. The dirt not only increases the wear of the guide surfaces, but also tends to misalign the tread-forming mold segments in their mold closure position, which causes tire quality problems. The flat surfaces of Pacciarini et al. do not admit dirt, but neither do they offer lateral support to the tread-forming segments during radial expansion or contraction.

THE INVENTION

In the mold of this invention, guide surfaces are used which maintain sealed surface engagement throughout the opening and closing of the mold. A plurality of tread-forming mold segments are mounted for sliding movement on an actuator. The segments and the actuator are provided with parallel curved guide surfaces, the curvature of which is constant along the axis of sliding motion, so as to maintain surface contact. This continuous surface contact advantageously inhibits the penetration of dirt between the sliding surfaces, while maintaining structural support of the tread-forming mold segments throughout mold operation. The wear on the guide surfaces is accordingly reduced, and alignment of the segments is preserved.

The guide surfaces are shaped to form curved segments aligned parallel with guide axes. The guide axes are inclined relative to the mold axis so that axial movement of the actuator causes radial movement of the tread-forming segments. The guide axis associated with each guide surface intersects the mold axis at an axial location determined by the guide axis inclination angle. The curvature for each curved shaped guide surface is selected to provide extended surface engagement between the tread-forming mold segments and the actuator. The use of cylindrical or elliptical guide surfaces advantageously permits machining with ordinary rotating tools. Guide elements may be employed between circumferentially adjacent pairs of guide surfaces to provide close tolerance sliding retention of the segments to the actuator.

The described curvature of the guide surfaces on the actuator permits the use of a large number of such guide surfaces and corresponding tread-forming mold segments in a high quality mold for vulcanizing belted radial-cord tires.

DETAILED DESCRIPTION OF THE PREFERRED EMBODIMENT

Figure 1:
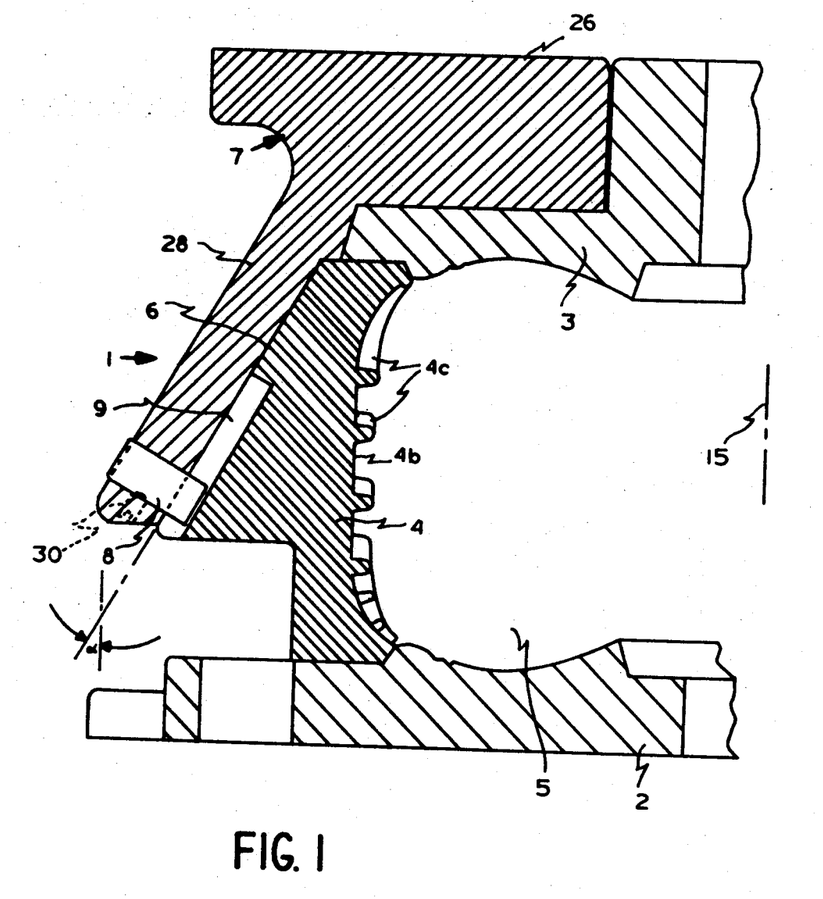
FIG. 1 is a fragmentary radial section of an annular mold apparatus in accordance with one embodiment of the invention, the mold parts being shown in closed, or tire-molding, position.

With reference to FIG. 1, a tire-forming mold generally designated 1 includes a lower sidewall-forming mold body 2, and an upper sidewall-forming mold body 3. Between mold bodies 2 and 3 are a plurality of annularly distributed tread-forming mold segments such as segment 4. The tread-forming mold segments 4 are mounted for sliding movement on an actuator 7 which, as seen in FIG. 1, is a trough-shaped annular body. The actuator 7 includes a ring-shaped section 26 and an outwardly flared annular support section 28. The support section 28 is provided with curved guide surfaces 6 distributed circularly about the mold axis 15 and inclined thereto with an angle $\alpha$. The tread-forming mold segments 4 are provided with like-shaped curved guide surfaces 6 which face the guide surfaces on the support section 28. Stops, such as pins 8 secured by set screws 30, engage grooves 9 in segments 4. Stops 8 cooperate with grooves 9 and permit but limit sliding movement of the tread-forming mold segments 4 along the support section 28. The tread-forming mold segments 4 are provided with suitable patterns such as those designated 4c, to form a tire tread pattern as is well known in the art.

Figure 2:
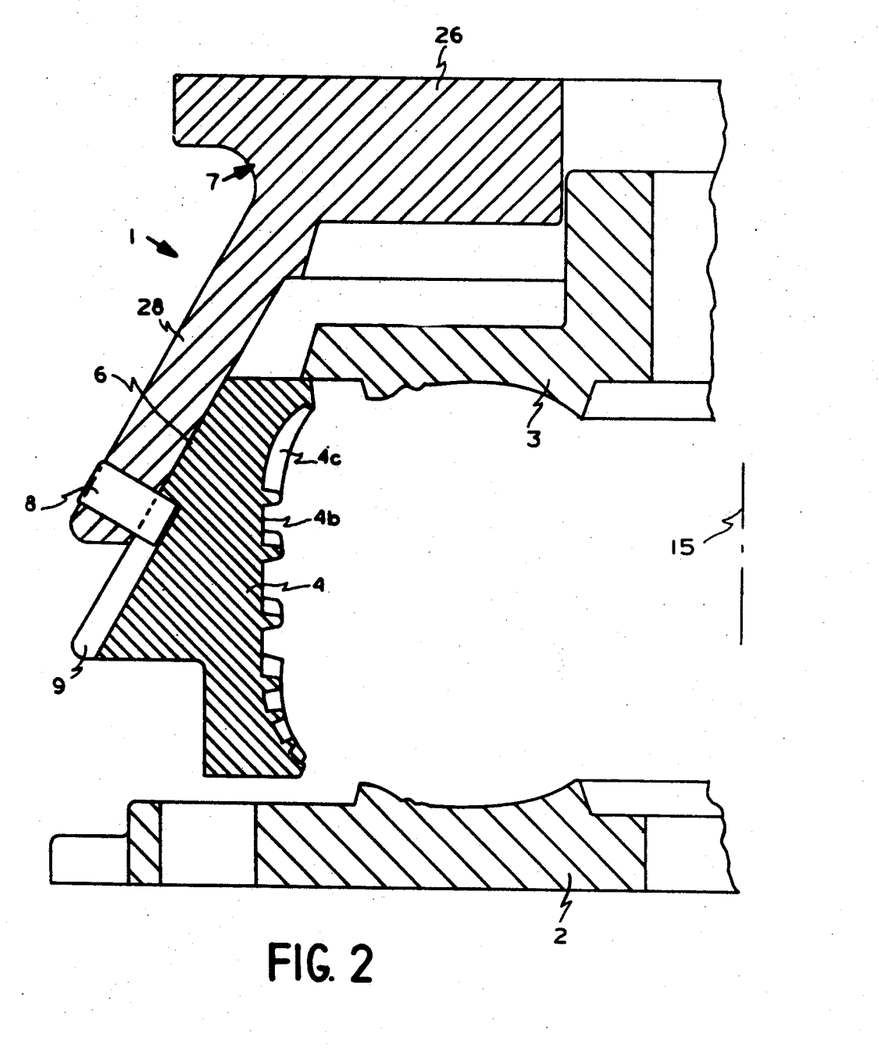
FIG. 2 is a similar section of the same mold, with the mold parts shown in open position.

As illustrated in FIG. 2, the sidewall-forming mold segments 2 and 3 are separable by motion along mold axis 15 to open the mold 1. Accordingly the actuator 7 is axially movable in order to provide separation of the sidewall segments 2 and 3. Since the surfaces 6 are inclined to the mold axis 15, motion of the tread-forming mold segments 4 in guiding relationship with surfaces 6 of the actuator 7 has a component of radial separation of the segments until the stops 8 encounter the ends of grooves 9.

Each guide surface 6 on the tread-forming mold segments 4 and the actuator 7 is shaped to define a segment of a circular cylinder whose axis 32 is inclined with respect to the mold axis 15. The outline of such a cylinder is indicated by line 13 in the bottom view of FIG. 4, and the circular cross-section of the cylinder is suggested by the circle 14. The term "cylinder" is used here in a sense which comprehends a surface which is formed on a circular base curve and which defines an axis of cylindrical symmetry. In one embodiment of this invention, the cylinder is defined by the locus of all elements such as lines 13 which intersect the base circle 14 and are parallel to an axis 32 (see the schematic or geometric diagrams in FIGS. 5 through 7). The base circle 14 is established by a plane perpendicular to the mold axis 15.

Figure 11:
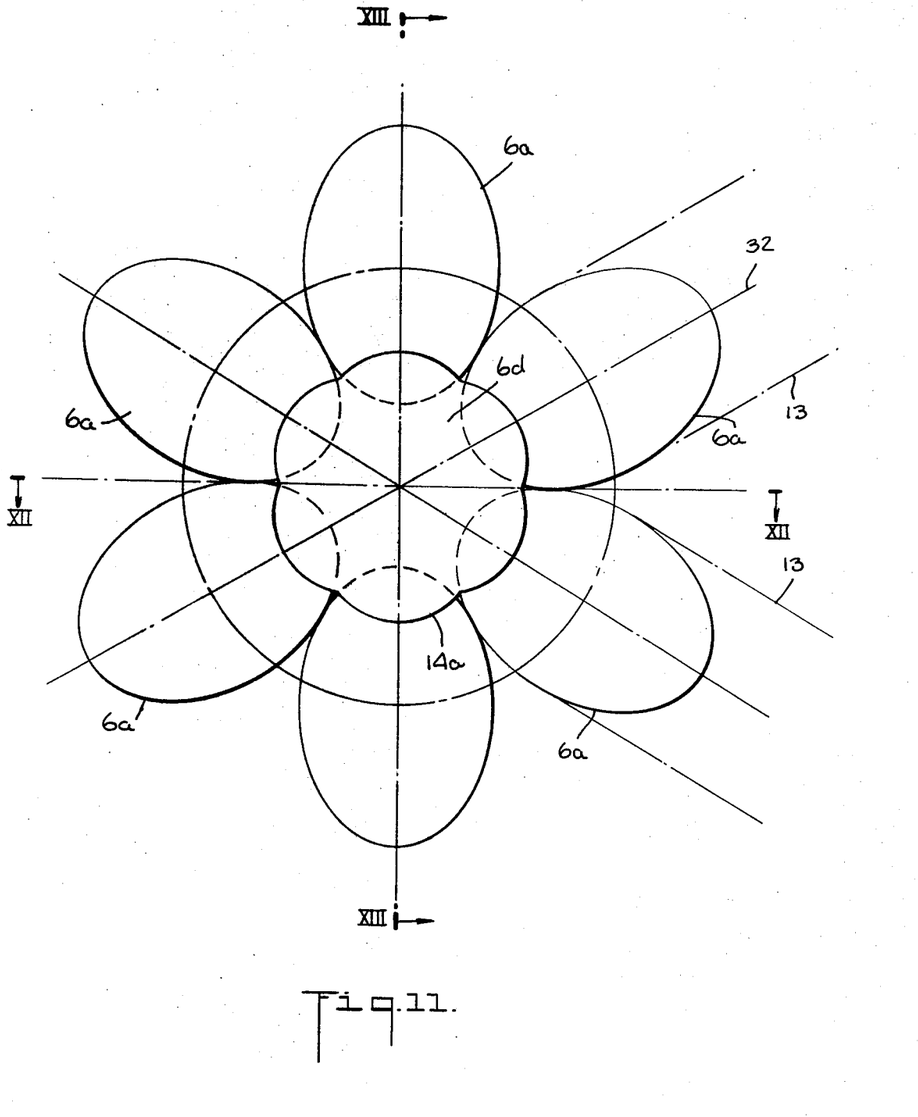
FIG. 11 is a schematic representation of the geometric pattern surfaces of the actuator according to a further embodiment of the invention, and is equivalent to a view along the vertical axis of the mold.
Figure 12:
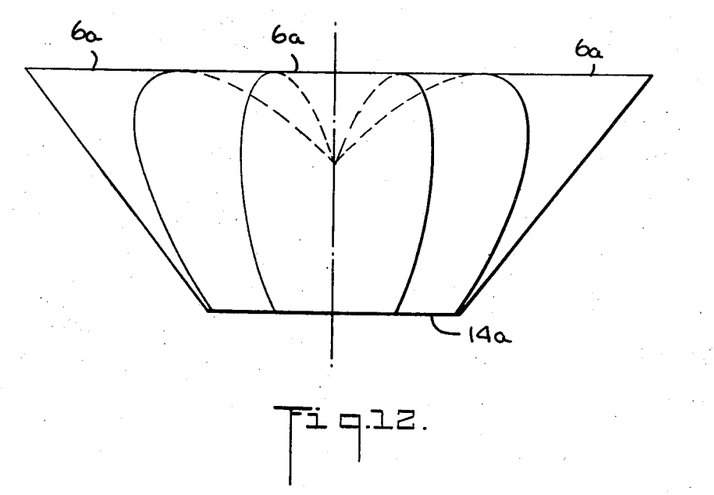
FIGS. 12 and 13 are section views of the geometrical surface depicted in FIG. 11, taken along the lines XII—XII and XIII—XIII thereof respectively, looking in the direction of the arrows.
Figure 13:
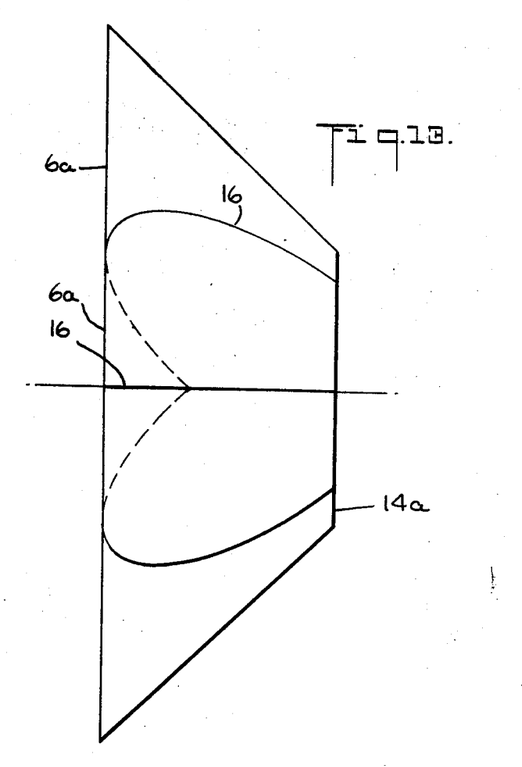

In a further embodiment, as shown in FIGS. 11 to 13, each guide surface 6a on the tread-forming mold segments 4 and the actuator 7 is shaped to define a segment of a circular cylinder whose axis 32 is inclined with respect to the mold axis 15. When viewed, in section, by a plane perpendicular to the mold axis 15, the cross-section of the cylinder 13 is elliptical. In this embodiment each guide surface 6a is limited to that portion of the cylinder 13 which does not overlap with an adjacent cylinder. The bottom view of the mold has an undulating curve 14a. As viewed from the bottom of the mold, each cylinder 13 projects upward, the axis 32 being at an angle to the mold axis 15.

It will be apparent that each axis 32 and each cylinder 13 is inclined at an angle. The angle of inclination of the guide axes 32 of cylinders 13 relative to the mold axis 15, angle $\alpha$ in FIG. 1, may fall between about 5° and about 40°, and is preferably in the range from about 15 to about 30°. Lines 16 in FIGS. 16, 7, 12 and 13 show the intersections between circumferentially adjacent cylinders 13.

The amount of curvature of the guide surfaces 6 or 6a may be made small, to provide radially dep guidance of the tread-forming mold segments 4. With a small amount of curvature of the guide surfaces, a larger number of tread-forming mold segments 4 may be used, and circumferential as well as radial guidance of the segments is obtained by virtue of the wrap-around effect. Fabrication is simplified if an even number of tread-forming mold segments 4 are used, preferably six or more.

Figure 3:
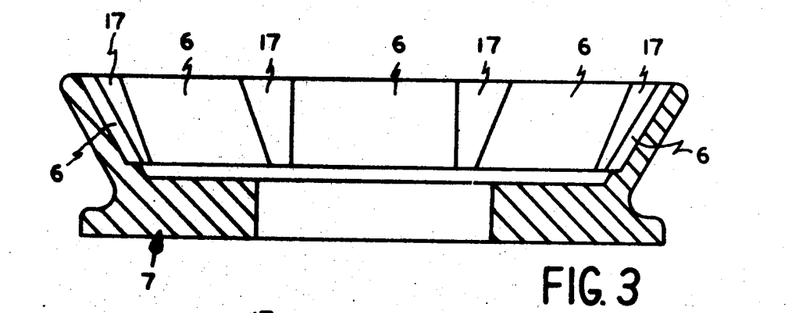
FIG. 3 is a diametric section of an actuator employed in the mold apparatus of FIGS. 1 and 2, taken along lines III—III of FIG. 4, looking in the direction of the arrows.
Figure 4:
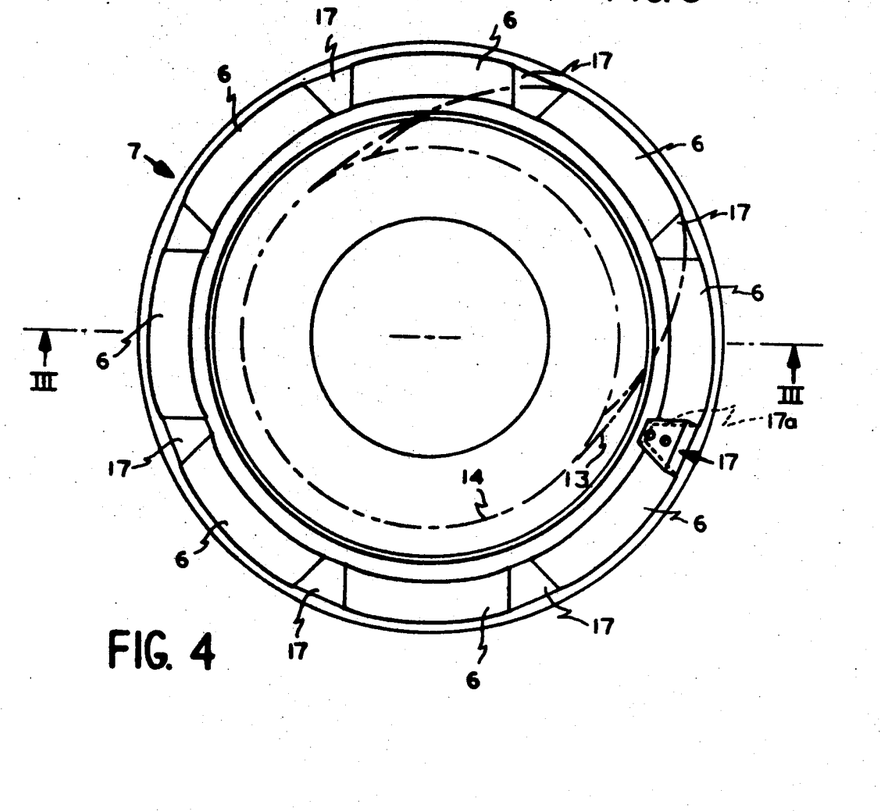
FIG. 4 is a bottom plan view of the actuator shown in FIGS. 1 through 3.
Figures 5, 7:
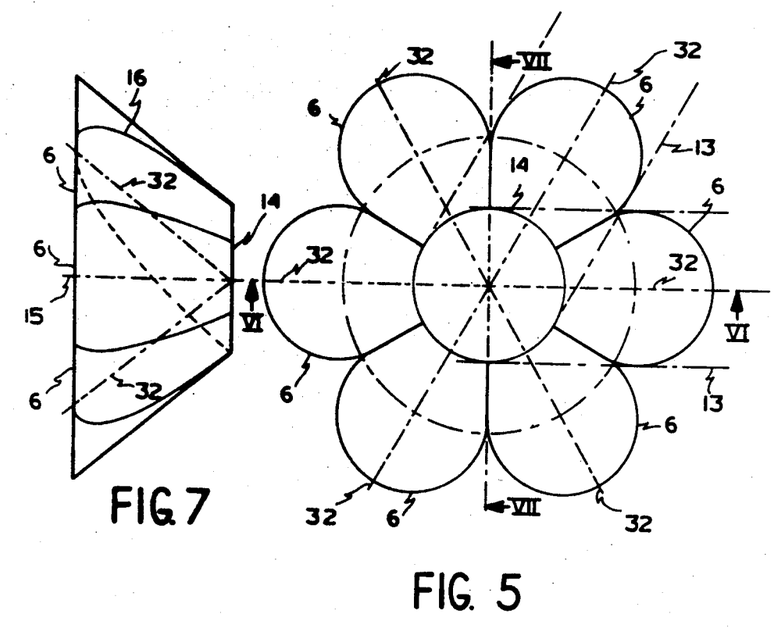
FIG. 5 is a schematic representation of the geometric surfaces of the actuator of the preceding figures, and is equivalent to a view along the vertical axis of the mold.
FIGS. 6 and 7 are sectional views of the geometric surfaces depicted in FIG. 5, taken along the lines VI—VI and VII—VII thereof respectively, looking in the directions of the arrows.
Figure 6:
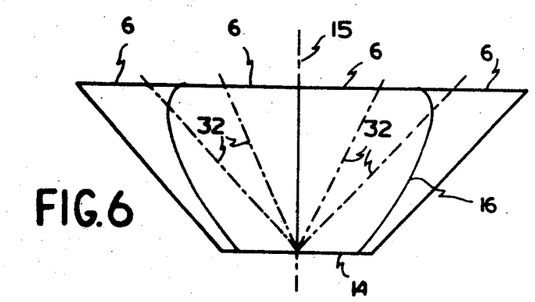
Figure 8:
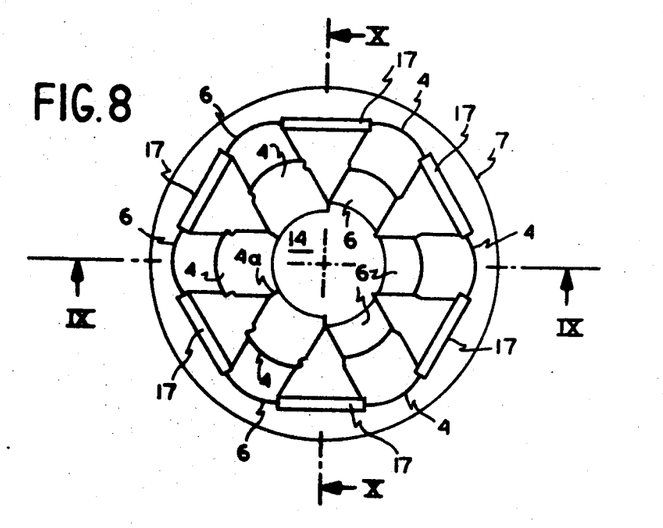
FIG. 8 is a top plan view of the actuator of the previous figures.
Figure 9:
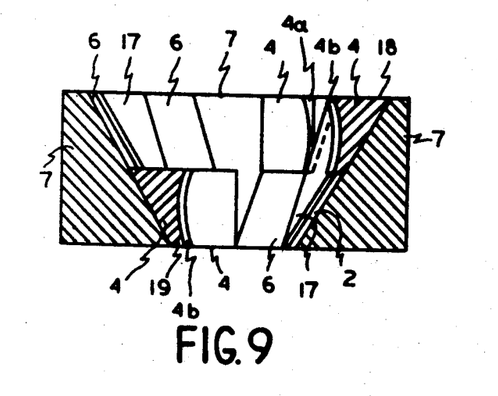
FIGS. 9 and 10 are sectional views of the actuator of FIG. 8, taken along the lines IX—IX and X—X thereof respectively, looking in the directions of the arrows.
Figure 10:
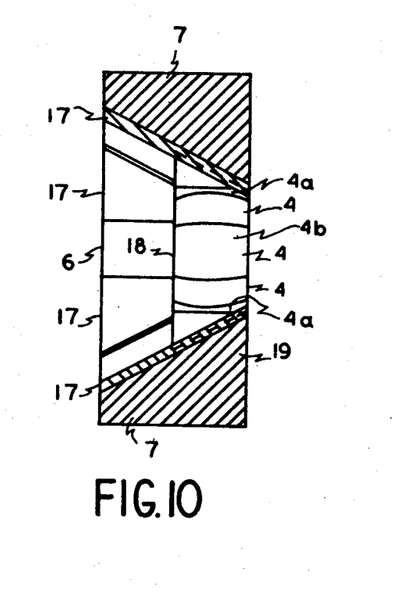

In the mold depicted in FIGS. 8 through 10 the annular actuator 7 is shown provided with six guide surfaces 6 and a corresponding number of tread-forming mold segments 4. In the schematic representation of FIGS. 5 to 7, there is shown six guide surfaces 6 arranged about the circumference of base circle 14. In the schematic representation of FIGS. 11 to 13, there is shown six guide surfaces 6a arranged about the periphery of base curve 14a. The plan view of the actuator having guide surfaces according to FIGS. 11 to 13 would be the same as FIG. 8 since the nature of the curvature is not shown. The operative relationship, general construction and sequencing of the several parts of the mold apparatus is the same for cylindrically or elliptically curved guide surfaces 6 or 6a, respectively. The description, of the mold apparatus according to FIGS. 1 to 4 and FIGS. 8 to 10, is applicable to either the guide surfaces curved as shown in FIGS. 5 to 7 or FIGS. 11 to 13. It is sufficient therefore to describe the construction and operation of the mold apparatus according to FIGS. 1 to 4 and FIGS. 8 to 10, since such construction and operation is applicable to either embodiment. For illustrative purposes, those tread-forming segments at the left of section line X—X are shown in the "mold closed" position, and those at the right are shown in the "mold open" position. Lateral guide elements 17 (FIGS. 3, 4 and 8 through 10) are provided between each pair of circumferentially adjacent guide surfaces 6 on the actuator 7, and are shaped so as to match with the tread-forming segments 4 and thereby retain the latter in surface contact with the actuator 7. This is achieved by shaping edge surfaces 17a (seen in FIG. 4) so that they mate with each adjoining side surface of segments 4. These guide elements 17 are tapered radially inwardly to permit convergence of the segments 4 during their mold-closing motion. The elements 17 may either be trapezoidal as depicted in FIGS. 3 and 4, or triangular as in FIGS. 8–10.

With the tread-forming mold segments 4 in mold closure position, they contact one another at faces 4a to form a continuous tread-forming mold surface 4b (see FIG. 10) facing the mold cavity and structurally supported by the lower ends of the extended guide faces 6. The sidewall-forming mold segments 2 and 3, shown in FIG. 1, adjoin surfaces 18 and 19 respectively of the tread-forming segments 4 (see FIGS. 9 and 10) to complete the mold enclosure when the segments 4 are in closed position.

When tread-forming mold segments 4 are moved radially outwardly to the open position, the cylindrical configuration assures that their rear guide surfaces 6 will remain in surface contact with the guide surfaces 6 of the actuator 7, thus continuing to derive structural support therefrom, and also preventing dirt from collecting between the guide surfaces.

The height of a guide surface 6 on the actuator 7, as measured along a guide surface axis 32, is from one to two times the corresponding height of a segment 4. Preferably, the guide surfaces 6 of the actuator 7 are about one and a half times as long as those of the tread-forming mold segments 4.

The guide surfaces, whether cylindrical or elliptical, can be manufactured using conventional machining techniques. The use of elliptical guide surfaces, however, is of a greater practical advantage. The machining of an elliptical surface requires less relative movements between the cutting tool and the workpiece.

It will now be appreciated that a mold for vulcanizing pre-shaped pneumatic tires in accordance with this invention has the advantage of continuous guide surface contact throughout opening and closing of the mold, so that extended life and precision operation are both obtained.

Since the foregoing description and drawings are merely illustrative, the scope of protection of the invention has been more broadly stated in the following claims; and these should be liberally interpreted so as to obtain the benefit of all equivalents to which the invention is fairly entitled.

The embodiments of the invention in which an exclusive property or privilege is claimed are defined as follows:

1. In a mold for vulcanizing pre-shaped pneumatic tires wherein a toroidal mold cavity is formed of axially opposed separable sidewall mold sections and a plurality of radially movable tread-forming mold segments arranged about the mold axis and supported by radially outwardly located actuator means, and the tread-forming mold segments cooperate to form an annular tread-forming mold surface facing the mold cavity, and guide means actuate said tread-forming mold segments into radial movement for opening and closing of the mold cavity in response to axial relative movement; the improvement wherein:

said guide means and said tread-forming mold segments are provided with facing like-shaped parallel guide surfaces in sliding contact at respective radially outward sides of the tread-forming mold segments, said guide surfaces being parallel to respective guide axes which are inclined with respect to the mold axis, an inclination angle of the guide axes relative to the mold axis being selected to impart radial movement to each of the tread-forming mold segments;

each of said guide surfaces being curved about its respective guide axis to maintain extended guide surface contact between the guide means and the tread-forming mold segments throughout the opening and closing of the mold cavity for enhanced structural support of the tread-forming mold segments during said movement.

2. The mold of claim 1 wherein said guide surfaces are segments of cylindrical surfaces parallel to the respective guide axes.

3. The mold of claim 1 wherein each guide surface is a circular cylinder inclined relative to the mold axis.

4. The mold of claim 1 wherein said guide axes are oriented to form an inclination angle with the mold axis that is between about 5° and about 40°.

5. The mold of claim 4 wherein said guide axes are oriented to form an inclination angle with the mold axis that is between about 15° and about 30°.

6. The mold of claim 1 wherein there are at least six of said tread-forming mold segments, whereby the radius of curvature of each of the guide surfaces is sufficiently small to provide radially extended guidance contact between the guide means and the tread-forming mold segments for enhanced segment support.

7. The mold of claim 1 wherein said guide means includes an annular trough-shaped member comprising a ring body and an annular radially outwardly flared support section being provided with a plurality of said guide surfaces which face radially inwardly and are uniformly distributed about the mold axis, and guide elements located between the guide surfaces on the support section slidingly to engage circumferential sides of the tread-forming mold segments.

8. The mold of claim 7 wherein said guide elements are of generally tapered shape and sized to maintain circumferential engagement with the tread-forming mold segments during radial movement thereof.

9. The mold of claim 7 wherein said outwardly flared support section is sized to extend between about one to about two times the height of a tread-forming mold segment as measured along a line parallel to the axis of a guide surface.

10. In a mold for vulcanizing belted radial-cord tires wherein a circular mold cavity is formed of axially opposed separable sidewall mold segments and a plurality of radially movable tread-forming mold segments arranged about the mold axis and supported by radially outwardly located actuators, the improvement comprising:

an annular body formed of a ring segment and a radially outwardly flared annular support section, said annular body and said tread-forming mold segments being mounted for movement of one of them relative to the other along the mold axis for actuation of the mold, said flared support section being provided with a plurality of guide surfaces arranged about the mold axis and facing the mold axis, each of said guide surfaces being cylindrically curved and oriented at an inclination angle with respect to the mold axis to effect opening and closing of the mold during said relative axial movement; and said plurality of tread-forming mold segments are shaped jointly to form an annular tread-forming mold surface facing the mold cavity, each of said tread-forming mold segments being provided with a curved guide surface of like shape as the guide surface on the flared support section of the annular body, said tread-forming segments being mounted to the annular body for sliding movement between the facing curved guide surfaces thereof along the angle of inclination thereof whereby to provide radial movement of the tread-forming mold segments in response to said relative axial movement while maintaining guide surface engagement throughout said motion for enhanced structural support of the segments.

11. The mold of claim 10 further including:
a plurality of guide elements disposed circumferentially adjacent the guide surfaces, said guide elements being shaped to retain the tread-forming mold segments in sliding surface engagement with the annular body guide surfaces throughout mold opening and closing.

12. The mold of claim 11 wherein the guide elements are tapered for radial convergence of said segments during the mold-closing motion thereof.

13. The mold of claim 1 wherein each guide surface has a circular cross-section as determined by a plane perpendicular to respective guide axes.

14. The mold of claim 3 wherein each guide surface has a circular cross-section as determined by a plane perpendicular to the respective guide axes.

15. The mold of claim 1 wherein each guide surface has an elliptical cross-section as determined by a plane perpendicular to the mold axis.

16. The mold of claim 3 wherein each guide surface has an elliptical cross-section as determined by a plane perpendicular to the mold axis.

17. The mold of claim 15 wherein the elliptical cross-section of each guide surface does not overlap with the elliptical cross section of an adjacent guide surface.

18. The mold of claim 16 wherein each elliptical cross-section guide surface is a portion of non-overlapping adjacent cylinders.

19. In a mold for vulcanizing belted radial-cord tires wherein a circular mold cavity is formed of axially opposed separable sidewall mold segments and a plurality of radially movable tread-forming mold segments arranged about the mold axis and supported by radially outwardly located actuators, the improvement comprising:

an annular body formed of a ring segment and a radially outwardly flared annular support section, said annular body and said tread-forming mold segments being mounted for movement of one of them relative to the other along the mold axis for actuation of the mold, said flared support section being provided with a plurality of guide surfaces arranged about the mold axis and facing the mold axis, each of said guide surfaces being elliptically curved and oriented at an inclination angle with respect to the mold axis to effect opening and closing of the mold during said relative axial movement; and said plurality of tread-forming mold segments are shaped jointly to form an annular tread-forming mold surface facing the mold cavity, each of said tread-forming mold segments being provided with a curved guide surface of like shape as the guide surface on the flared support section of the annular body, said tread-forming segments being mounted to the annular body for sliding movement between the facing curved guide surfaces thereof along the angle of inclination thereof whereby to provide radial movement of the tread-forming mold segments in response to said relative axial movement while maintaining guide surface engagement throughout said motion for enhanced structural support of the segments.

20. The mold of claim 19 further including:
a plurality of guide elements disposed circumferentially adjacent the guide surfaces, said guide elements being shaped to retain the tread-forming mold segments in sliding surface engagement with the annular body guide surfaces throughout mold opening and closing.

21. The mold of claim 19 wherein the guide elements are tapered for radial convergence of said segments during the mold-closing motion thereof.

* * * * *